(12) United States Patent
Kawamura (10) Patent No.: US 8,625,309 B2
(45) Date of Patent: Jan. 7, 2014

(54) SEMICONDUCTOR INTEGRATED CIRCUIT AND SWITCHING POWER SUPPLY SYSTEM

(75) Inventor: Kazuhiro Kawamura, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 363 days.

(21) Appl. No.: 13/178,909

(22) Filed: Jul. 8, 2011

(65) Prior Publication Data

US 2012/0008346 A1  Jan. 12, 2012

(30) Foreign Application Priority Data

Jul. 8, 2010  (JP) .................................. 2010-155974

(51) Int. Cl.
*H02M 3/335* (2006.01)

(52) U.S. Cl.
USPC .................. 363/21.01; 363/21.15; 363/21.16

(58) Field of Classification Search
USPC .......................................... 363/21.01–21.18
See application file for complete search history.

(56) References Cited

U.S. PATENT DOCUMENTS

| | | | | |
|---|---|---|---|---|
| 6,061,257 A | * | 5/2000 | Spampinato et al. | 363/21.13 |
| 7,061,225 B2 | * | 6/2006 | Yang et al. | 324/103 P |
| 7,339,359 B2 | | 3/2008 | Choi et al. | |
| 7,764,521 B2 | * | 7/2010 | Lin et al. | 363/21.16 |
| 7,859,862 B2 | * | 12/2010 | Lin | 363/21.12 |
| 8,199,533 B2 | * | 6/2012 | Shimada | 363/21.01 |
| 2007/0046294 A1 | | 3/2007 | Matthews et al. | |

FOREIGN PATENT DOCUMENTS

| | | |
|---|---|---|
| JP | 2002-136124 A | 5/2002 |
| JP | 2007-014082 A | 1/2007 |
| JP | 2007-073954 A | 3/2007 |
| JP | 2007-258294 A | 10/2007 |
| JP | 2008-533972 A | 8/2008 |

* cited by examiner

*Primary Examiner* — Jessica Han
(74) *Attorney, Agent, or Firm* — Rossi, Kimms & McDowell LLP (57) ABSTRACT

A control circuit can be provided with a comparator detecting a turning-off of a semiconductor switch from a voltage generated in an auxiliary winding of a transformer and inputted to a zero current detecting terminal, a timer outputting a signal after a specified length of time from the time at which the turning-off of the semiconductor switch is detected, and a comparator detecting from voltages inputted to a current detecting terminal a second voltage signal different from an ordinary first voltage signal inputted when the semiconductor switch is made turned-on. Thus, the second voltage signal supplied from mode switching circuits as an externally inputted mode switching signal can be made also detected by the existing current detecting terminal. By detecting the second voltage signal after the specified length of time from the turning-off of the semiconductor switch, switching of an operation mode becomes possible without newly providing any specialized terminal.

7 Claims, 5 Drawing Sheets

SEMICONDUCTOR INTEGRATED CIRCUIT AND SWITCHING POWER SUPPLY SYSTEM

BACKGROUND OF THE INVENTION

1. Field of the Invention

Embodiments of the present invention relate semiconductor integrated circuits and particularly to semiconductor integrated circuits for carrying out stabilization of an output voltage of an insulating transformer.

2. Related Art

A switching power supply system is mounted on an electronic device such as, for example, a cellular phone or a digital camera to be used for stepping up or stepping down an input voltage to be supplied to a load. In such a switching power supply system, states relating to the operations of a power supply are set with various methods according to power supply specifications required by electronic devices.

Important parameters such as a switching frequency with respect to a switching power supply system affect characteristics of the system such as a power supply noise characteristic, dimensions of parts, breakdown voltages of parts and temperature rise of parts, so that there are some ideas of methods of setting such important parameters. In the switching power supply circuit disclosed in JP-A-2007-14082 (see paragraph Nos. [0039] to [0046], etc.), a DC voltage supplied from a DC power supply is stepped up to be supplied to six white light emitting diodes connected in series as a load so as to drive the white light emitting diodes. In the switching power supply circuit, for adjusting the switching frequency, an external resistor as an adjusting resistor is provided for the oscillating circuit of a step up chopper regulator.

When a switching power supply circuit is normally used for electronic equipment such as a portable appliance, a liquid crystal television set or a DVD (Digital Versatile Disc) player, noises generated from the switching power supply circuit may be classified into noises having adverse effects on other integrated circuits in the electronic equipment and noises having no adverse effects. The invention of the switching power supply circuit disclosed in JP-A-2007-14082, since the resistance value of the external resistor and the switching period are in a linear relation to each other, is formed so that the switching period is freely varied by replacing one external resistor to facilitate adjustment of produced noises. However, for applying the invention to a power supply control IC (Integrated Circuit) including a step up chopper regulator, there is left such a problem as to require a specialized terminal for newly connecting a frequency adjusting resistor to the IC.

A power supply control IC for controlling a switching power supply system has the number of terminals come to be limited due to requirements for reductions in cost and in the package area. Therefore, in many cases, power supply control ICs have no specialized terminal provided for setting parameters other than the above explained switching frequency. In such case, for complying with various power supply specifications of electronic equipment, the lineup of power supply control ICs themselves must be made increased.

An increase in the lineup of power supply control ICs by power supply specification of electronic equipment will cause an increase in costs of products. Thus, for reducing the cost of electronic equipment, a product comes to be required which is capable of making selections of a plurality of necessary kinds of operating conditions with one power supply control IC.

As a system addressing such requirement, in JP-A-2007-73954 (see paragraph Nos. [0003] to [0028], etc.), a system is disclosed which system carries out the setting of an operating state during the initialization period of a power supply control IC without increasing the number of terminals of the power supply control IC. The described system, for carrying out selection of a required functional parameter and a required operation mode from a plurality of functional parameters and operation modes, is to actualize settings of a plurality of operating states with a single component by, for example, selecting a specified capacitance value of capacitance values of a multifunctional capacitor coupled to a pin of an integrated circuit. Here, a multifunctional capacitor is a capacitor which has, in addition to functions of setting in the initialization period functional parameters, operation modes or other device characteristics of the integrated circuit to which the multifunctional capacitor is connected, normal functions of some kinds for the normal operation of the integrated circuit. For example, a capacitor such as a power supply pin decoupling capacitor or a feedback pin loop compensating capacitor can be used as a parameter/mode selection capacitor during initialization.

In the system disclosed in JP-A-2007-73954, with the capacitance value of the above explained capacitor such as a power supply pin decoupling capacitor or a feedback pin loop compensating capacitor, a capacitor originally arranged for other purpose, determined for being applied to mode setting, the mode setting is appropriately carried out. However, after the mode setting in the initialization period is ended, the capacitor comes to be used for its original purpose. Therefore, each of the capacitance values of the capacitors such as the power supply pin decoupling capacitor and a feedback pin loop compensating capacitor must be set to a magnitude suited for actualizing its original purpose.

Here, the feedback pin loop compensating capacitor has its original purpose to compensate the frequency characteristic of the feedback pin loop of a power supply control IC and is to be disposed so that no feedback loop for a power supply control in a switching power supply system becomes unstable. The feedback pin loop compensating capacitor, with its capacitance value set to be less than the value optimum for the stability of the feedback loop, causes the system to be unstable to oscillate. Conversely, the capacitance value set to be more than the optimum value causes the response as a power supply system to become slow, which makes the output voltage impossible to recover soon to the variation of a load, for example. Therefore, the capacitance value of the capacitor significantly affects the response of a feedback system to be a problem of restricting the design itself of a switching power supply in that the change in the capacitance value limits the adjustment of phase compensation and causes an abnormal oscillation of the power supply.

Moreover, in general, the following three kinds of cases are considered in the method of supplying a power supply voltage to a power supply control IC. A first case is the case in which like in the case disclosed in JP-A-2007-73954, a power supply voltage is supplied from an external power supply connected to different terminals of the power supply control IC to be produced as a power supply voltage by an internal regulator. A second case is the case in which in an initialization period at startup, a power supply voltage is produced by a startup current produced by a startup circuit (corresponding to the internal regulator in the first case) connected to an external power supply and, in a normal operation, a power supply voltage is supplied from the auxiliary winding of an insulating transformer. A third case is the case in which an external power supply is used.

For using a power supply pin decoupling capacitor as a multifunctional capacitor, a regulator producing a constant current for charging the capacitor is necessary in the power supply control IC. This is because the power supply pin decoupling capacitor is a capacitor to be connected to a power supply pin (between a power supply pin and a ground pin) of the power supply control IC for supplying a power supply voltage to the power supply control IC itself. The power supply pin decoupling capacitor, however, is a capacitor that functions as a buffer when power consumption of the power supply control IC becomes high to cause the supply of power supply voltage to become insufficient or to cause the power supply voltage to vary. In addition, the power supply pin decoupling capacitor also functions for removing noises such as ripples in a voltage on an electric power supply line. Accordingly, for achieving such original object, the capacitance value of the power supply pin decoupling capacitor must be made large to some extent. Thus, when a power supply pin decoupling capacitor with a large capacitance value is to be charged with a constant current in a short time, the value of the constant current supplied from the regulator must be set large, which requires the use of a large-scale regulator for generating a large constant current. Therefore, the use of a multifunctional capacitor causes a problem with respect to cost.

In the third case, a power supply voltage is supplied to the power supply control IC with power supply pins connected to an external power supply, so that the power supply pin decoupling capacitor is brought into a state of being always connected to the external power supply. However, although the power supply pin decoupling capacitor is charged by a constant current in such a state of connection, no distinction is possible as to whether the power supply pin decoupling capacitor is charged by the current from the external power supply or charged by the constant current produced in the power supply control IC. Namely, for using the power supply pin decoupling capacitor for mode setting in an initialization period, the power supply pins must be disconnected from the external power supply and a circuit for the disconnection is to be provided out of the power supply control IC. Thus, the method disclosed in JP-A-2007-73954 can be said to be inadequate for being applied to the third case to set parameter/mode.

As was explained in the foregoing, the method of using the multifunctional capacitor disclosed in JP-A-2007-73954 directly affects the normal function of the power supply control IC. Thus, there were such problems that the usage was difficult, a large scale regulator must be provided to result in an increase in cost, and some power supply voltage supply systems were impossible to be used.

Furthermore, in JP-A-2007-258294 (see paragraph Nos. [0023] to [0027], etc.), there is a description of a semiconductor integrated circuit which is provided so that a mode switching signal is made inputted without increasing the number of terminals. Here, of terminals necessary for a normal operation, a terminal is used to which a voltage is inputted whose voltage range in a normal operation has significant differences between a power supply voltage and between a ground voltage. Thus, a voltage near the power supply voltage or near the ground voltage is inputted to the terminal so that a mode switching of the semiconductor integrated circuit is carried out. Therefore, according to the technique disclosed in JP-A-2007-258294, a semiconductor integrated circuit can be provided to which a mode switching signal can be inputted without increasing the number of terminals.

However, in the semiconductor integrated circuit disclosed in JP-A-2007-258294, feedback terminals, to which the feedback signal of a power supply control IC is inputted, are used so as to carry out switching between a test mode and a normal operation mode. Therefore, for supplying a mode setting signal and a feedback signal to the feedback terminals with the signals switched, a circuit, producing the mode setting signal and, along with this, carrying out switching between the mode setting signal and the feedback signal, must be provided externally to the power supply control IC. The way of mode switching like this, although it causes no problem in a test carried out before mounting the power supply control IC on a product, is difficult to be carried out after the power supply control IC is mounted on the switching power supply system.

For solving above problems in the circuits disclosed in JP-A-2007-14082 and JP-A-2007-258294 and in the system disclosed in JP-A-2007-73954, the applicant submitted international patent application no. PCT/JP2010/054218. The circuit disclosed in the application is a circuit in which a resistor for making a decision with respect to a state is added to a terminal for outputting a control signal or a terminal for inputting a sensing current signal. At the rising of a power supply voltage, the resistance value is read in so as to set an operation mode according to the magnitude of the resistance value. The circuit, however, is operated on condition that the mode setting is carried out in the early stage, so that the circuit does not permit a mode change during operation.

Compared with this, the circuit disclosed in JP-A-2002-136124 is a circuit in which the output of a control winding (auxiliary winding) for detecting the output voltage of a secondary output winding of a transformer is made to be pulled down by a photocoupler to thereby give instructions for a mode change to a control unit. To a power supply control IC forming the control unit, this is to require a specialized terminal receiving the output of the control winding. This is because when forming a switching power supply system which uses a transformer with its input voltage provided by carrying out switching of a DC voltage, to which an AC voltage supplied from an AC power supply is rectified, or of a DC voltage supplied from a high voltage DC power supply, an auxiliary winding is generally used first for supplying a power supply voltage to a power supply control IC forming a control unit.

Namely, when receiving a power supply voltage from the auxiliary winding, for making the supply of the power supply voltage stable, a capacitor with a capacitance being large to some extent is connected to the terminal receiving the supply. Therefore, even though a voltage is supplied to the terminal with the way disclosed in JP-A-2002-136124 applied, a signal for switching the mode sometimes can not be transmitted well. Even in the case when the signal for switching the mode can be transmitted well, the electric charges in the power supply voltage stabilizing capacitor are made discharged to cause problems of making the operation of the power supply control IC become unstable and increasing power consumption. Therefore, an additional terminal is absolutely necessary for being provided for receiving a mode changing signal. A specific example of a configuration provided with the additional terminal will be shown in the following.

Figure 4:
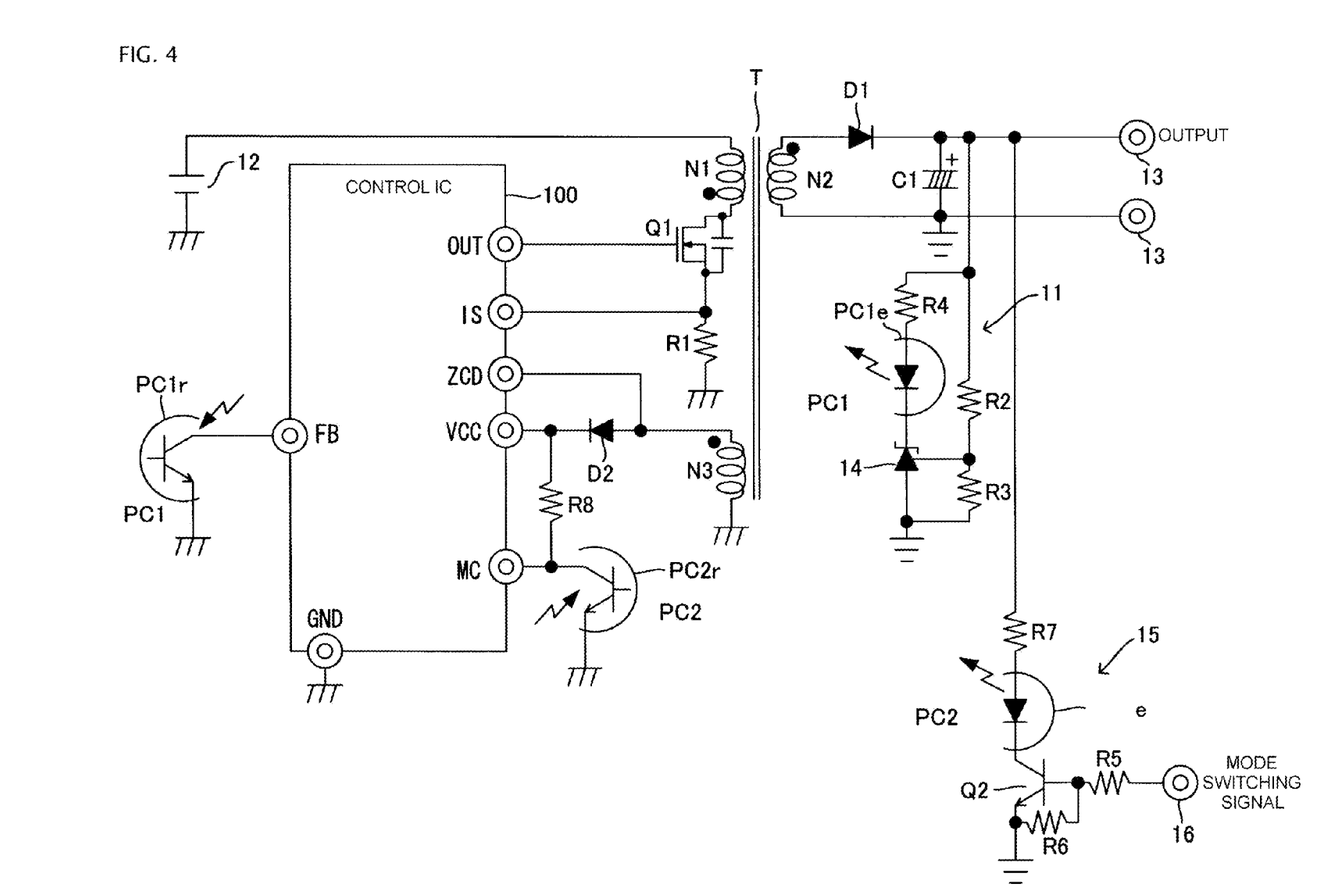
FIG. 4 is a circuit diagram showing an example of a configuration of a circuit of a related switching power supply system.
Figure 5:
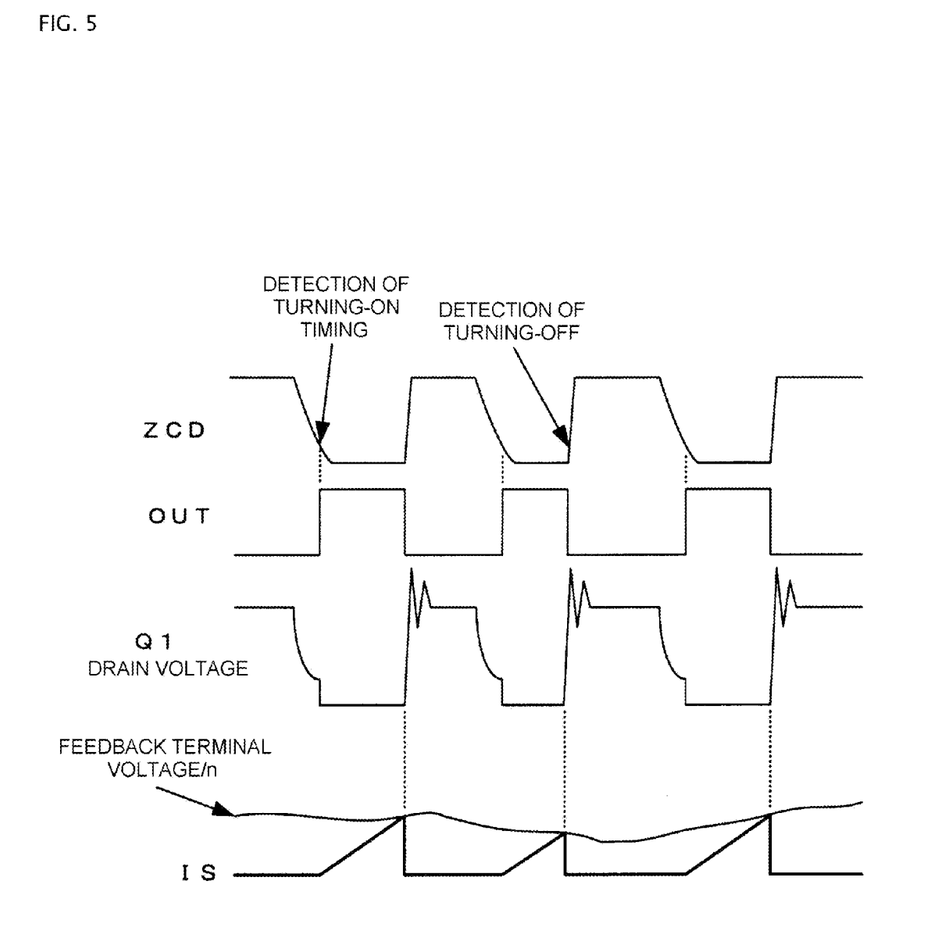
FIG. 5 is a waveform diagram showing operation waveforms of basic parts of the related switching power supply system.

FIG. 4 is a circuit diagram showing an example of a configuration of a circuit of a related switching power supply system and FIG. 5 is a waveform diagram showing operation waveforms of basic parts of the related switching power supply system.

The switching power supply system shown in FIG. 4 is a switching power supply carrying out switching using self-excited oscillation and having a transformer T, a semiconductor switch Q1, a control IC 100 and a feedback circuit 11. The transformer T has a primary winding N1, a secondary winding N2 and an auxiliary winding N3. To one end of the primary winding N1 of the transformer T, a DC power supply 12 is connected. The other end of the primary winding N1 of the transformer T is grounded through the semiconductor switch Q1 and a resistor R1 for current detection. The secondary winding N2 of the transformer T is connected to output terminals 13 through a rectifying and smoothing circuit with a diode D1 and an output capacitor C1.

The semiconductor switch Q1 is to be an N channel MOSFET (Metal-Oxide-Semiconductor Field-Effect Transistor) here. The drain of the semiconductor switch Q1 is connected to the primary winding N1 of the transformer T, the source is connected to the resistor R1 and the gate is connected to a control and output terminal OUT of the control IC 100.

One end of the auxiliary winding N3 of the transformer T is connected to a zero current detecting terminal ZCD of the control IC 100 and to a power supply terminal VCC of the control IC 100 through a diode D2. The other end of the auxiliary winding N3 is grounded.

To the output terminal 13 on the positive polarity side of the switching power supply system, the feedback circuit 11 is connected. The feedback circuit 11 has resistors R2 and R3 both detecting variation of the output voltage at the output terminals 13, a shunt regulator 14, a photocoupler PC1 including a light-emitting side photocoupler element PC1e and a photo-detecting side photocoupler element PC1r, and a resistor R4 for limiting a current. The photo-detecting side photocoupler element PC1r is connected to a feedback terminal FB in the control IC 100 with the collector and is grounded with the emitter. The shunt regulator 14 let a current, corresponding to the variation in an output voltage detected by the resistors R2 and R3, flow in the light-emitting side photocoupler element PC1e and, by the photo-detecting side photocoupler element PC1r, an error signal corresponding to the variation is inputted to the feedback terminal FB in the control IC 100.

Here, when the control IC 100 makes the semiconductor switch Q1 turned-off, no current flows in the resistor R1, by which the level of the signal inputted to a current detecting terminal IS is made to be zero. When a signal making the semiconductor switch Q1 turned-on is outputted from a control output terminal OUT, the semiconductor switch Q1 is made turned-on. This makes a current flow in the primary winding N1 of the transformer T and the semiconductor switch Q1 to make electromagnetic energy stored in the primary winding N1. The electromagnetic energy stored in the period is, during the period in which the semiconductor switch Q1 is made turned-off, released from the secondary winding N2 to the output capacitor C1 through the diode D1.

The output voltage of the switching power supply system is easily affected by variations in the input voltage from the DC power supply 12 and in load. Thus, the feedback circuit 11 carries out feedback of a voltage corresponding to an error to the specified output voltage to the control IC 100 as a feedback signal. By comparing the feedback signal with a voltage signal to which a current flowing in the primary winding N1 and the semiconductor switch Q1 is converted by the resistor R1, a duty as a period during which the semiconductor switch Q1 is turned-on is controlled, by which an operation for stabilizing the output voltage is carried out.

Therefore, as shown in the waveform diagram of FIG. 5, the timing at which the state of the semiconductor switch Q1 is changed from a turned-on state to a turned-off state becomes the time at which a (feedback terminal voltage)/n (n: a certain value), a voltage to which a feedback terminal voltage at the feedback terminal FB is reduced to 1/n (or a voltage to which the feedback terminal voltage is level shifted to 1/n) and a voltage at the current detecting terminal IS becomes equal to each other. While, the timing at which the semiconductor switch Q1 is turned-on is the time at which the detected voltage at the zero current detecting terminal ZCD comes closer to zero. Namely, when the semiconductor switch Q1 is turned-off to allow electromagnetic energy stored in the primary winding N1 to be released to the output side through the secondary winding N2, the voltage across the secondary winding N2 and the voltage across the primary winding N1 are decreased. This state is also transmitted to the auxiliary winding N3. Thus, when the voltage across the auxiliary winding N3 is made inputted to the zero current detecting terminal ZCD to detect that the detected voltage comes closer to zero, the semiconductor switch Q1 is made turned-on. Namely, the zero current detecting terminal ZCD is a terminal for detecting the timing at which the semiconductor switch Q1 is to be turned-on. By repeating turning-on and -off of the semiconductor switch Q1, stabilizing control of the output voltage is carried out.

For example, when the output voltage of the switching power supply system is about to lower, the voltage at the feedback terminal FB comes to increase. Then, the turned-on period of the semiconductor switch Q1 until the feedback terminal voltage/n coincides with the voltage at the current detecting terminal IS (or a voltage to which the feedback terminal voltage/n is level-shifted) becomes longer to increase an amount of the energy stored in the primary winding N1, which acts so as to increase the output voltage.

Moreover, the switching power supply system is provided with a mode switching circuit 15. The mode switching circuit 15 has a mode switching signal input terminal 16, which is connected to the base of a transistor Q2 through a resistor R5. Between the base and emitter of the transistor Q2, a resistor R6 is connected and the emitter of the transistor Q2 is grounded. The collector of the transistor Q2 is connected to the output terminal 13 on the positive polarity side of the switching power supply system through a light-emitting side photocoupler element PC2e of a photocoupler PC2, including the light-emitting side photocoupler element PC2e and a photo-detecting side photocoupler element PC2r, and a resistor R7. The collector of the photo-detecting side photocoupler element PC2r is connected to a switching signal detecting terminal MC and is further connected to the power supply terminal VCC of the control IC 100 through a pull-up resistor R8. The emitter of the photo-detecting side photocoupler element PC2r is grounded.

With a mode switching signal inputted to the mode switching signal input terminal 16 being at an H (High) level, the transistor Q2 is made turned-on to bring the light-emitting side photocoupler element PC2e to emit light. This makes the photo-detecting side photocoupler element PC2r turned-on to bring the electric potential of the switching signal detecting terminal MC to an L (Low) level. Moreover, with the mode switching signal being at an L level, the transistor Q2 is made turned-off to cause the light-emitting side photocoupler element PC2e to emit no light. This turns-off the photo-detecting side photocoupler element PC2r to bring the electric potential of the switching signal detecting terminal MC to become the H level. The control IC 100 carries out switching of a mode depending on whether the electric potential of the switching signal detecting terminal MC is the L level or the H level.

As is explained above, in the circuit of the related switching power supply system, when the switching of a mode is desired, the switching signal detecting terminal MC was independently provided in the control IC 100. Moreover, when the insulation condition between the primary side and the secondary side of the transformer T is desired to be kept, the photocoupler PC2 including the light-emitting side photocoupler element PC2e and the photo-detecting side photocoupler element PC2r were used. Moreover, when switching was carried out between operation modes, a mode switching signal was externally inputted to change the logic state at the switching signal detecting terminal MC and the change was detected by the inner circuit of the control IC 100, by which switching to a specified operation was carried out.

With such way of detecting the switching signal, however, for making the control IC detect an externally inputted switching signal, a specialized terminal must be provided in the control IC. For example, a current standard control IC for a switching power supply for AC to DC conversion or DC to DC conversion is provided with eight pins (terminals). The minimum kinds of necessary functions are incorporated so as to be exhibited through the eight pins. Therefore, when no free pins are provided for new functions, some of present convenient functions must be eliminated for providing the new functions or, in the worst case, the package must be changed for increasing the number of pins. This causes the control IC to be insufficient in functions or to be provided at increased cost.

The invention was made in view of such points with an object of providing a semiconductor integrated circuit that can detect an externally inputted mode switching signal without newly providing any specialized terminal, and a switching power supply system provided with such a semiconductor integrated circuit.

SUMMARY OF THE INVENTION

In embodiments of the invention, for addressing the above and other problems, a semiconductor integrated circuit is provided, which is a semiconductor integrated circuit including: a control output terminal which outputs a signal driving a semiconductor switch connected to a primary winding of a transformer; a current detecting terminal to which a first voltage signal is inputted to which signal a current flowing in the semiconductor switch is converted; a feedback terminal to which a voltage corresponding to an error of a secondary side output voltage of the transformer is fed back; and a zero current detecting terminal which is connected to an auxiliary winding of the transformer for detecting from the output voltage of the auxiliary winding of the transformer one of a timing at which the semiconductor switch is to be turned-on and both of the timing at which the semiconductor switch is to be turned-on and a timing at which the semiconductor switch is turned off, the semiconductor integrated circuit including: a timer which outputs a signal after a specified length of time from the timing at which the semiconductor switch is made turned-off; a comparator which is connected to the current detecting terminal to detect a second voltage signal different from the first voltage signal; and an operation mode switching unit which carries out switching between operation modes according to whether the comparator detects the second voltage signal or not during a period during which the semiconductor switch is made turned-off subsequent to the time at which the timer outputted the signal after the specified length of time from the timing at which the semiconductor switch is made turned-off.

Moreover, in certain embodiments, a switching power supply system is provided, which is a switching power supply system including: a transformer which has a primary winding, a secondary winding and an auxiliary winding; a semiconductor switch connected to the primary winding; a feedback circuit which carries out feedback of a voltage corresponding to an error of an output voltage outputted from the secondary winding; and a semiconductor integrated circuit including: a current detecting terminal to which a first voltage signal is inputted to which signal a current flowing in the semiconductor switch is converted; a feedback terminal to which a voltage corresponding to an error of the output voltage fed back by the feedback circuit is inputted; and a zero current detecting terminal which is connected to the auxiliary winding for detecting from the output voltage of the auxiliary winding one of a timing at which the semiconductor switch is to be turned-on and both of the timing at which the semiconductor switch is to be turned-on and a timing at which the semiconductor switch is turned-off, the semiconductor switch being controlled so as to stabilize the output voltage by the first voltage signal and the voltage corresponding to the error, the switching power supply system being characterized in that: the switching power supply system is provided with a mode switching circuit which is able to supply a second voltage signal different from the first voltage signal to the current detecting terminal during a period during which the semiconductor switch is made turned-off according to an external mode switching signal, and the semiconductor integrated circuit includes: a timer which outputs a signal after a specified length of time from the timing at which the semiconductor switch is made turned-off; a comparator which is connected to the current detecting terminal to detect a second voltage signal; and an operation mode switching unit which carries out switching between operation modes according to whether the comparator detects the second voltage signal or not during a period during which the semiconductor switch is made turned-off subsequent to the time at which the timer outputted the signal after the specified length of time from the timing at which the semiconductor switch was made turned-off.

According to such a semiconductor integrated circuit and a switching power supply system provided with such a semiconductor integrated circuit, the semiconductor integrated circuit can be provided with the timer, the comparator and the operation mode switching unit. Thus, at the current detecting terminal, in addition to the first voltage signal detected when the semiconductor switch is made turned-on, the second voltage signal comes to be detected when the semiconductor switch is made turned-off. By the timer allowing the comparator so as to detect the second voltage signal after a specified length of time has passed from the turning-off of the semiconductor switch, the switching between different operation modes by the operation mode switching unit is made possible without newly providing any specialized terminal.

According to embodiments of the semiconductor integrated circuit and the switching power supply system with the above configurations, the current detecting terminal in the semiconductor integrated circuit functions so that, in addition to making the first voltage signal in a normal operation inputted in a period in which the semiconductor switch is made turned-on, the second voltage signal based on an externally inputted mode switching signal can be also detected in a period in which the semiconductor switch is made turned-off.

By making the second voltage signal detectable, which is normally considered not to appear at the current detecting terminal in a period in which the semiconductor switch is made turned-off, there is provided the advantage of making a specified mode switching become possible without newly providing an additional specialized terminal for detecting an external signal or without carrying out omission of an existing useful function which omission is for additionally providing an external signal detecting function.

DETAILED DESCRIPTION

Detailed explanations are made below with respect to embodiments of the invention with reference to the attached drawings.

Figure 1:
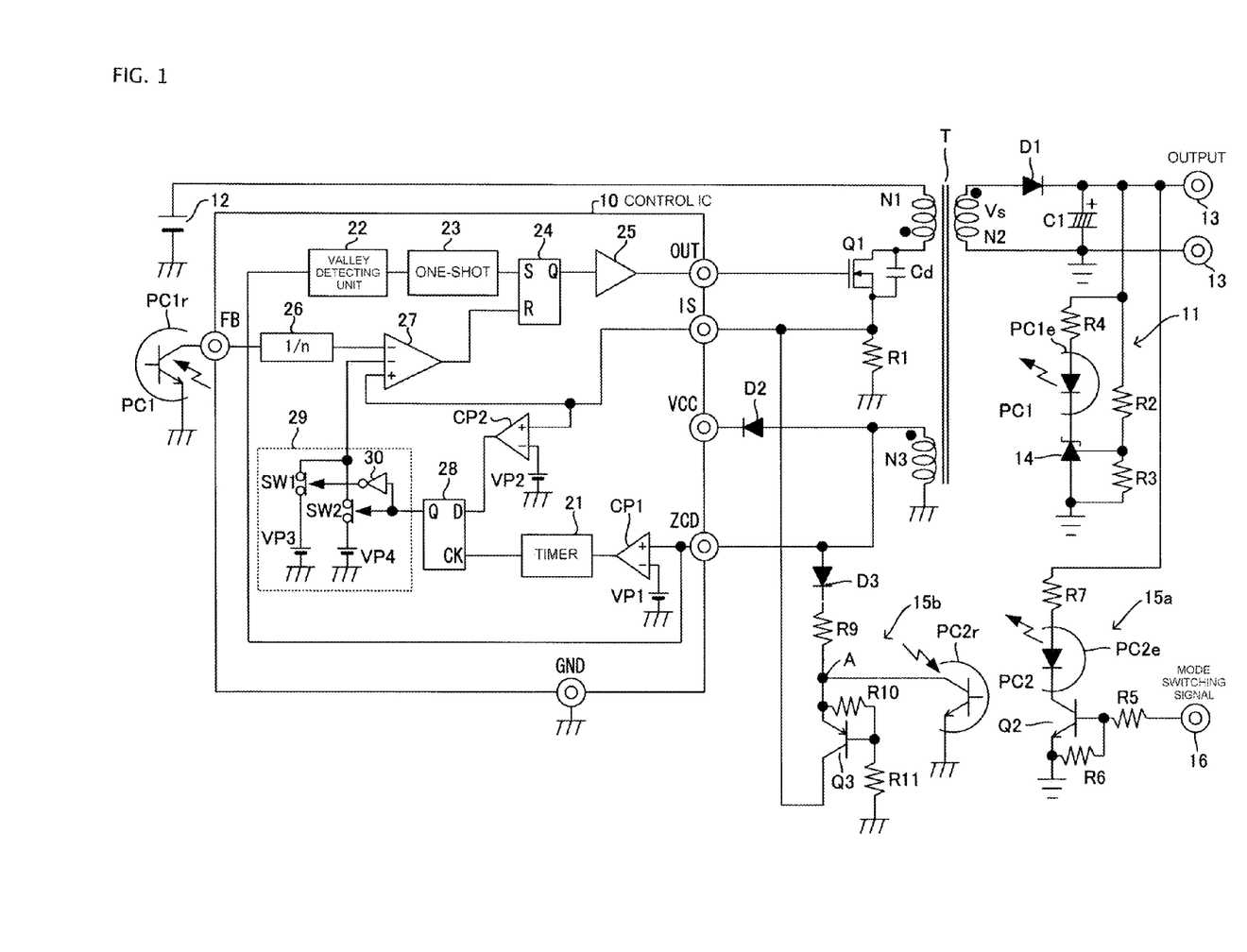
FIG. 1 is a circuit diagram showing an example of a configuration of a circuit of a switching power supply system according to a first embodiment of the invention.
Figure 2:
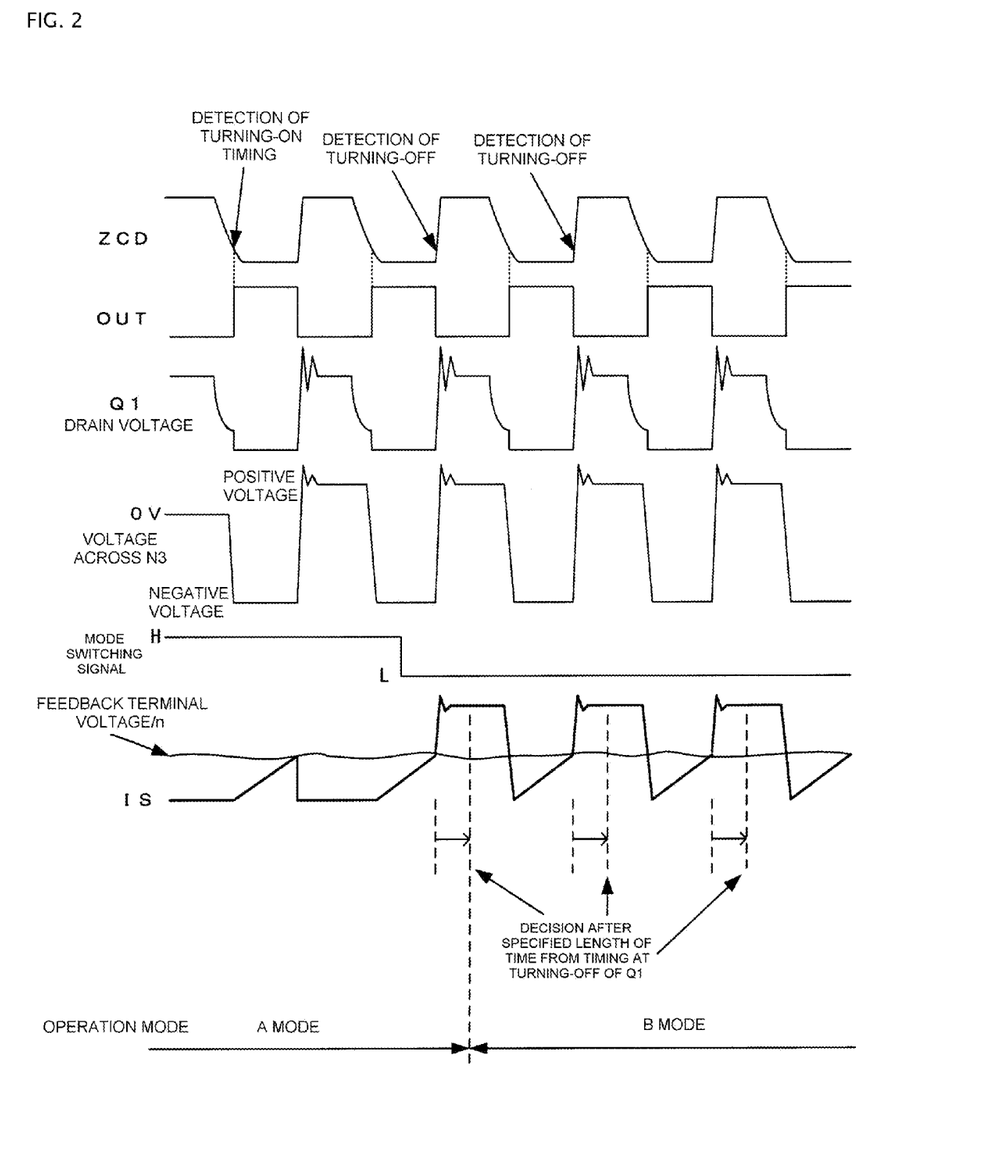
FIG. 2 is a waveform diagram showing operation waveforms of basic parts of the switching power supply system according to the first embodiment of the invention.

FIG. 1 is a circuit diagram showing an example of a configuration of a circuit of a switching power supply system according to a first embodiment of the invention and FIG. 2 is a waveform diagram showing operation waveforms of basic parts of the switching power supply system.

In FIG. 1 and in FIG. 3 that is to be referred to later, constituents having the same functions as those of the constituents in the example of the circuit configuration of the related switching power supply system shown in FIG. 4 are denoted with the same reference numerals and signs.

The switching power supply system has a transformer T, a semiconductor switch Q1, a control IC 10 and a feedback circuit 11. The transformer T has a primary winding N1, a secondary winding N2 and an auxiliary winding N3. To one end of the primary winding N1 of the transformer T, a DC power supply 12 is connected.

The DC power supply 12 can be a power supply in which the output of a commercial AC power supply is subjected to a full-wave rectification by a diode bridge. The other end of the primary winding N1 of the transformer T is grounded through the semiconductor switch Q1 and a resistor R1 for current detection. The secondary winding N2 of the transformer T is connected to output terminals 13 through a rectifying and smoothing circuit with a diode D1 and an output capacitor C1.

The semiconductor switch Q1 is to be an N channel MOSFET here. The drain of the semiconductor switch Q1 is connected to the primary winding N1 of the transformer T, the source is connected to the resistor R1 and a current detecting terminal IS of the control IC 10, and the gate is connected to a control and output terminal OUT of the control IC 10. Between the drain and the source of the semiconductor switch Q1, a capacitor Cd for resonance is connected.

One end of the auxiliary winding N3 of the transformer T is connected to a power supply terminal VCC of the control IC 10 through a diode D2 and, along with this, connected to a zero current detecting terminal ZCD of the control IC 10.

To the output terminal 13 on the positive polarity side of the switching power supply system, the feedback circuit 11 is connected. The feedback circuit 11 has resistors R2 and R3 connected in series both of which are connected between the output terminal 13 on the positive polarity side and the ground on the secondary side to detect variation of the output voltage at the output terminals 13. Moreover, between the output terminal 13 on the positive polarity side and the ground on the secondary side, a resistor R4 for limiting a current, a light-emitting side photocoupler element PC1e of a photocoupler PC1 and a shunt regulator 14 are connected in series. To the reference terminal of the shunt regulator 14, the connection section common to the resistor R2 and the resistor R3 is connected. While, in the photocoupler PC1, a photo-detecting side photocoupler element PC1r paired with the light-emitting side photocoupler element PC1e is connected to a feedback terminal FB in the control IC 10 with the collector and is grounded with the emitter. The shunt regulator 14 let a current, corresponding to the variation in an output voltage detected by the resistors R2 and R3, flow in the light-emitting side photocoupler element PC1e and, by the photo-detecting side photocoupler element PC1r, an error signal corresponding to the variation is inputted to the feedback terminal FB in the control IC 10.

With this, a current mode control type switching power supply is formed in which the value of a voltage to which a current flowing in the semiconductor switch Q1 is converted and the value of a fed back voltage corresponding to an error in the output voltage are compared with each other to thereby carry out control of stabilizing the output voltage.

The switching power supply system is further provided with mode switching circuits 15a and 15b. The mode switching circuit 15a has a mode switching signal input terminal 16 to which a mode switching signal is inputted. The mode switching signal input terminal 16 is connected to the base of an NPN-type transistor Q2 through a resistor R5. The base of the transistor Q2 is connected to one end of a resistor R6, and the other end of the resistor R6 and the emitter of the transistor Q2 are connected to the ground on the secondary side. The collector of the transistor Q2 is connected to the output terminal 13 on the positive polarity side of the switching power supply system through a light-emitting side photocoupler element PC2e of a photocoupler PC2, including the light-emitting side photocoupler element PC2e and a photo-detecting side photocoupler element PC2r, and a resistor R7.

While, in the mode switching circuit 15b, between one end of the auxiliary winding N3 connected to the zero current detecting terminal ZCD of the control IC 10 and the current detecting terminal IS, there are connected a diode D3, a resistor R9 for level adjustment and a PNP type transistor Q3 are connected in series. Between the emitter and the base of the transistor Q3, a resistor R10 is connected. The base of the transistor Q3 is connected to the ground through a resistor R11. Moreover, to a connection point A of the emitter of the transistor Q3 and the resistor R9 for level adjustment, a photo-detecting side photocoupler element PC2r is connected which is paired with the light-emitting side photocoupler element PC2e.

The control IC 10 has the power supply terminal VCC and a ground terminal GND. The power supply terminal VCC has a power supply voltage supplied from the auxiliary winding N3 and the ground terminal GND is connected to the ground on the primary side.

The control IC 10 further has a comparator CP1 to the non-inverting input terminal of which the zero current detecting terminal ZCD is connected. To the inverting input terminal of the comparator CP1, a voltage source VP1 is connected. With the voltage source VP1, a threshold voltage as a threshold level is set which is lower than a voltage appearing in the auxiliary winding N3 when the semiconductor switch Q1 is made turned-off. To the output terminal of the comparator CP1, a timer 21 is connected. The timer 21 has a function that starts its operation from a timing at which the comparator CP1 detects the turning-off of the semiconductor switch Q1 and, after a specified time has passed, outputs a pulse signal.

The zero current detecting terminal ZCD is also connected to the set terminal S of an RS flip-flop circuit 24 through a valley detecting unit 22 and a one-shot circuit 23. The output terminal Q of the RS flip-flop circuit 24 is connected to the control output terminal OUT of the control IC 10 through a driver 25.

The feedback terminal FB of the control IC 10 is connected to the inverting input terminal of a current comparator 27 through a level shift circuit 26. The output terminal of the current comparator 27 is connected to the reset terminal R of the RS flip-flop circuit 24.

The current detecting terminal IS of the control IC 10 is connected to the non-inverting input terminal of the current comparator 27 and the non-inverting input terminal of a comparator CP2. To the inverting input terminal of the comparator CP2, a voltage source VP2 is connected. With the voltage source VP2, a threshold voltage is set which is lower than a voltage appearing in the auxiliary winding N3 when the semiconductor switch Q1 is made turned-off and applied to the current detecting terminal IS through the diode D3, the resistor R9 and the transistor Q3 of the mode switching circuit 15b.

The output terminal of the comparator CP2 is connected to the data input terminal D of a D (delayed) flip-flop circuit 28, to the clock input terminal CK of which the timer 21, outputting a pulse signal, is connected.

The output terminal Q of the D flip-flop circuit 28 is connected to an overcurrent limiting threshold voltage changing circuit 29. The overcurrent limiting threshold voltage changing circuit 29 is shown as an example of an operation mode switching unit that switches an operation mode when a mode switching signal is externally inputted to the mode switching signal input terminal 16. In the embodiment, a case is shown in which an overcurrent limiting threshold voltage applied to the inverting input terminal of the current comparator 27 is changed according to a mode changing signal. Therefore, the overcurrent limiting threshold voltage changing circuit 29 is provided with two voltage sources VP3 and VP4, which are connected to an inverting input terminal of the current comparator 27 through a switch SW1 and a switch SW2, respectively. The switch SW1 is driven to be turned-on and -off by an inverter 30 receiving the output of the D flip-flop circuit 28 and the switch SW2 is driven to be turned-on and -off by the output of the D flip-flop circuit 28.

In the circuit of the switching power supply system as was explained above, as shown in FIG. 2, the turning-on of the semiconductor switch Q1 with an H level signal received from the control output terminal OUT makes a current flow in the primary winding N1 of the transformer T to store electromagnetic energy in the primary winding N1. At this time, the value of the current flowing in the primary winding N1 is converted to the value of a voltage by the resistor R1 to be inputted to the current detecting terminal IS. In addition, in the auxiliary winding N3 of the transformer T, a negative voltage is generated the value of which is expressed as the value of an input voltage×the number of turns of the auxiliary winding N3/the number of turns of the primary winding N1.

When the level of a detected voltage, which is inputted to the current detecting terminal IS, reaches the level of a (feedback terminal voltage)/n (n: a certain value), the voltage of a signal fed back to the feed back terminal FB with the voltage then made level shifted to 1/n by the level shift circuit 26, a reset signal is inputted to the reset terminal R of the RS flip-flop circuit 24 from the current comparator 27. This makes the RS flip-flop circuit 24 output an L level signal, by which the driver 25 carries out control so as to turn-off the semiconductor switch Q1.

The turning-off of the semiconductor switch Q1 allows the electromagnetic energy stored in the primary winding N1 of the transformer T to be released from the secondary winding N2 to the output capacitor C1 through the diode D1. In a period in which the semiconductor switch Q1 is made turned-off, a voltage Vs (=the output voltage of the power supply+the forward voltage of the diode D1 on the secondary side) is generated in the secondary winding N2 in the direction of letting a current flow in the diode D1 in the forward direction. At this time, a positive voltage is generated in the auxiliary winding N3 with magnitude becoming Vs×(the number of turns of the auxiliary winding N3)/(the number of turns of the secondary winding N2). The voltage is rectified by the diode D2 and supplied to the power supply terminal VCC of the control IC 10 to be used as a power supply voltage of the control IC 10.

On terminating the release of electromagnetic energy to the output capacitor C1, the drain voltage of the semiconductor switch Q1 is rapidly lowered due to the resonance in the circuit with the primary winding N1 and the capacitor Cd with a voltage induced in the auxiliary winding N3 also lowered. The voltage induced in the auxiliary winding N3 is also inputted to the zero current detecting terminal ZCD. When the voltage inputted into the zero current detecting terminal ZCD becomes lower than the threshold voltage of the valley detecting unit 22, the one-shot circuit 23 outputs a set signal, which is inputted to the RS flip-flop circuit 24 to turn-on the semiconductor switch Q1 again. By repeating the above switching operation, a specified power supply voltage is continuously supplied.

Here, when the operation mode of the switching power supply system is an A mode in which a mode switching signal of an H level (first logic state) is inputted to the mode switching signal input terminal 16, the transistor Q2 in the mode switching circuit 15a comes to be in a turned-on state to make an LED as the light-emitting side photocoupler element PC2e turned-on (emit light). This makes a phototransistor as the photo-detecting side photocoupler element PC2r turned-on to ground a connection point A on the emitter side of the transistor Q3. Thus, the transistor Q3 is reverse-biased to thereby be turned-off, by which the voltage of the auxiliary winding N3 does not exert any influence on the voltage at the current detecting terminal IS. Hence, at the current detecting terminal IS, like in the circuit of the related system, a voltage with a triangular waveform to which a current is converted into a voltage is generated only when the semiconductor switch Q1 is made turned-on.

When the operation mode is the A mode, as was explained before, no high positive voltage, which appears in the auxiliary winding N3 when the semiconductor switch Q1 is made turned-off, is inputted in the non-inverting input of the comparator CP2 through the current detecting terminal IS. Hence, the comparator CP2 always outputs an L level signal. While, the comparator CP1 detects a high positive voltage supplied from the auxiliary winding N3 each time the semiconductor switch Q1 is turned-off and the timer 21 outputs a pulse signal a specified time later from the instant when the high positive voltage is detected. Therefore, the D flip-flop circuit 28, at the time when the D flip-flop circuit 28 receives a pulse signal from the timer 21 at the clock input terminal CK, holds the L level signal outputted from the comparator CP2 and outputs the L level signal from the output terminal Q until the clock input terminal CK receives a next pulse signal. Thus, in the overcurrent limiting threshold voltage changing circuit 29, the switch SW1 is in a turned-on state (closed: in conduction state) by receiving an H level signal, to which the L level signal outputted from the output terminal Q of the D flip-flop circuit 28 is inverted by the inverter 30, to supply the voltage of the voltage source VP3 to the current comparator 27 as an overcurrent limiting threshold voltage. While, the switch SW2 directly receives the L level signal to be in a turned-off state (opened: shut off state).

Next, in the case of a B mode in which a mode switching signal of an L level (second logic state) is inputted to the mode switching signal input terminal 16, in the mode switching circuit 15a, the transistor Q2 is turned-off to make the LED as the light-emitting side photocoupler element PC2e turned-off (emit no light). This is to cause the phototransistor as the photo-detecting side photocoupler element PC2r in the mode switching circuit 15b to be made turned-off. Thus, when a positive voltage is generated in the auxiliary winding N3 in a period in which the semiconductor switch Q1 is made turned-off, the transistor Q3 is made turned-on to come to supply the generated positive voltage to the current detecting terminal IS.

Incidentally, in a period in which the semiconductor switch Q1 is made turned-on, the voltage across the auxiliary winding N3 becomes a negative voltage. Therefore, without taking any measures, the voltage at the current detecting terminal IS is pulled down to the negative side to make it impossible to carry out proper comparison of the voltage at the current detecting terminal IS with a feedback signal voltage. It is the diode D3 that is provided for avoiding this. The diode D3 prevents the voltage at the current detecting terminal IS from being pulled down onto the negative voltage side.

When the semiconductor switch Q1 is brought into a period in which the semiconductor switch Q1 is made turned-off, the resistor R1 comes to have no current flowing therein from the primary winding N1 of the transformer T through the semiconductor switch Q1 but have instead a current flowing from the auxiliary winding N3 due to a voltage generated in the auxiliary winding N3, by which the voltage at the current detecting terminal IS is pulled up onto the positive polarity side. At this time, by the resistor R9 for voltage level adjustment, the voltage value at the current detecting terminal IS can be adjusted. For example, when a threshold voltage determined by the voltage source VP2 of the comparator CP2 is taken as 0.5V, the resistance value of the resistor R9 for the voltage level adjustment is selected so that the voltage at the current detecting terminal IS becomes on the order of 1V.

In the control IC 10, the comparator CP1 compares the value of the voltage at the zero current detecting terminal ZCD with the threshold voltage set by the voltage source VP1 to detect the timing at which the semiconductor switch Q1 is made turned-off. While, the comparator CP2 compares the voltage at the current detecting terminal IS with the threshold voltage set by the voltage source VP2 to detect a voltage to be supplied during the period in which the semiconductor switch Q1 is made turned-off. The timer 21 is a device for making the operation of the D flip-flop circuit 28 so as not to be affected by the distortion in the voltage waveform at the current detecting terminal IS due to a noise produced at the instant at which the semiconductor switch Q1 is made turned-off and for making the operation of the D flip-flop circuit 28 wait until the voltage at the current detecting terminal IS sufficiently increases.

In a period in which the semiconductor switch Q1 is made turned-off, at a time after a specified time from the timing at which the semiconductor switch Q1 is made turned-off, the voltage at the current detecting terminal IS exceeding the threshold voltage, set by the voltage source VP2, makes the operation mode switched to a B mode. In the B mode, the output terminal Q of the D flip-flop circuit 28 outputs an H level signal. Thus, in the overcurrent limiting threshold voltage changing circuit 29, the inverter 30 inverts the inputted H level signal to an L level signal to control the switch SW1 so as to become in an opened state. While, to the switch SW2, the H level signal as the output of the D flip-flop circuit 28 is directly given to control the switch SW 2 so as to become in a closed state. This is to allow the voltage of the voltage source VP4 to be supplied to the current comparator 27 as an overcurrent limiting threshold voltage.

After this, even though the semiconductor switch Q1 is turned-on to cause the voltage at the current detecting terminal IS to become lower than the voltage of the voltage source VP2, no pulse signal from the timer 21 is inputted to the clock input terminal CK. Hence, the level of the signal at the output terminal Q is kept at an H level. Therefore, even though the semiconductor switch Q1 is made turned-on from a turned-off state, an operation mode never returns from the B mode to the A mode.

The voltage at the current detecting terminal IS, from the state of being raised during the period during which the semiconductor switch Q1 was made turned-off, drops down to a voltage close to zero volt simultaneously with the turning-on of the semiconductor switch Q1. At this time, there is a fear that the semiconductor switch Q1 is made accidentally turned-off immediately by an error signal such as a noise. This, however, is avoided by the one-shot circuit 23 continuously inputting set signals to the set terminal S of the RS flip-flop circuit 24 for a specified length of time (for example, the minimum turned-on width set at several hundreds of nanoseconds) when the valley detecting unit 22 detects a voltage that is to turn-on the semiconductor switch Q1. Thus, even though the switching noise produced when the semiconductor switch Q1 is made turned-on is large, the semiconductor switch Q1 is not made turned-off for the specified length of time from the time of being made turned-on, by which a faulty operation can be prevented that causes the semiconductor switch Q1 to be turned-off by a noise immediately after the semiconductor switch Q1 is made turned-on.

As a specific example of the B mode in which a mode switching signal is taken as an L level signal, a case is shown in which the switching power supply system is brought into a stand-by mode. In the stand-by mode, an overcurrent limiting threshold voltage is lowered (set to the condition under which the voltage of the voltage source VP3>the voltage of the voltage source VP4) so that an overcurrent limitation can be imposed with a load lighter than an ordinary load. Moreover, in the stand-by mode, it is required to lower excessive power consumption for the reduction of stand-by power consumption. In the B mode, however, the light-emitting side photocoupler element PC2e and the photo-detecting side photocoupler element PC2r are made turned-off to enable reduction in excessive power consumption by an amount consumed therein.

Figure 3:
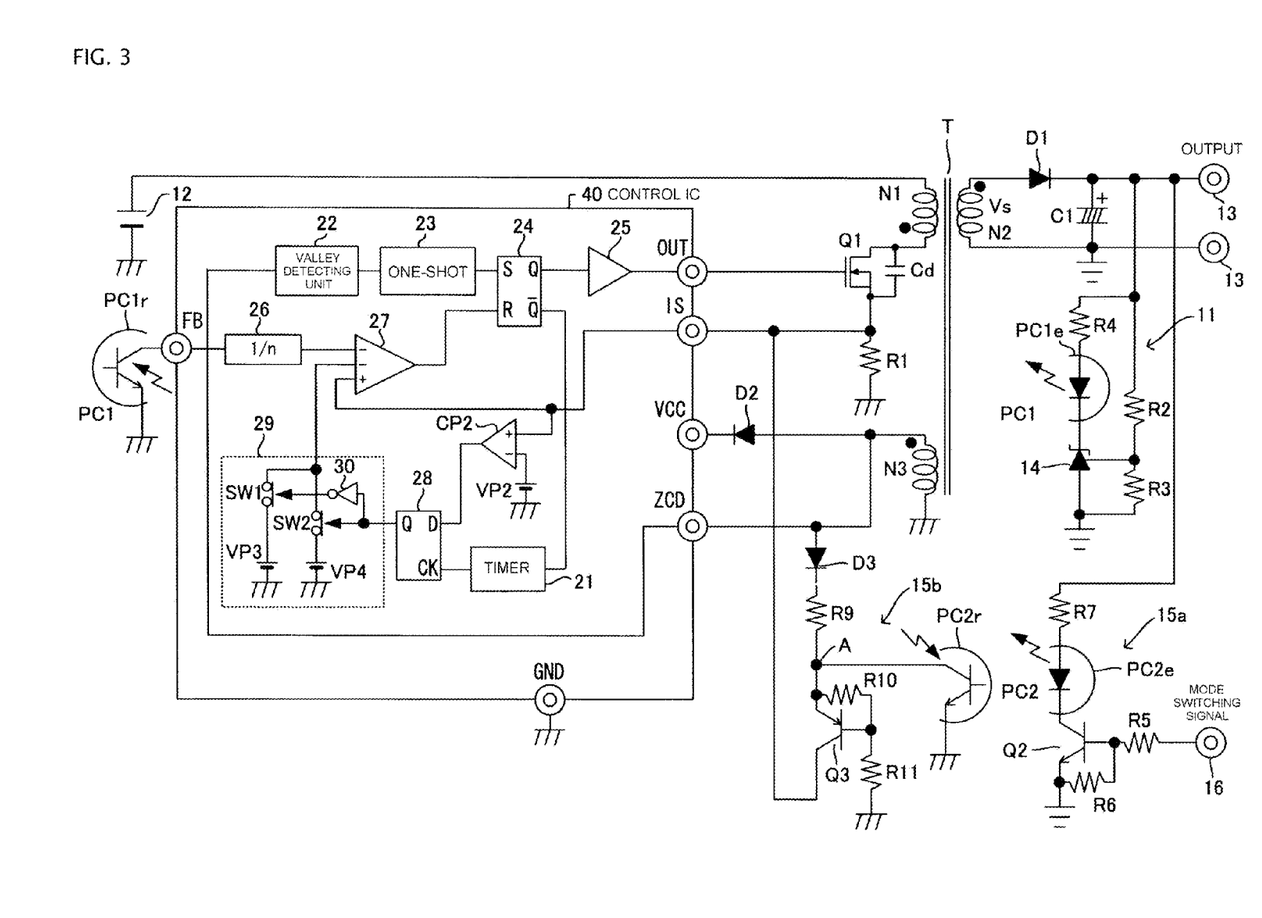
FIG. 3 is a circuit diagram showing an example of a configuration of a circuit of a switching power supply system according to a second embodiment of the invention.

FIG. 3 is a circuit diagram showing an example of a configuration of a circuit of a switching power supply system according to a second embodiment of the invention.

The switching power supply system according to the second embodiment, compared with the switching power supply system according to the first embodiment, is different from the first embodiment in the way of detecting the turning-off of the semiconductor switch Q1. Namely, in a control IC 40 in the switching power supply system according to the second embodiment, an inverting output terminal $\overline{Q}$ of the RS flip-flop circuit 24 and the timer 21 are connected. This allows the timer 21 to start its operation on receiving a turning-off control signal whose level becomes an H level at the turning-off of the semiconductor switch Q1, to output a pulse signal after a specified length of time has passed and to supply the outputted pulse signal to the clock input terminal CK of the D flip-flop circuit 28.

The other configuration of the control IC 40 is the same as that of the control IC 10 in the first embodiment and the configuration of the switching power supply system other than the control IC 40 is also the same as that of the first embodiment. Therefore, the operations of the control IC 40 and the switching power supply system using the control IC 40 are the same as those of the first embodiment. Therefore, detailed explanations thereof will be omitted here.

While the present invention has been particularly shown and described with reference to the preferred embodiments thereof, it will be understood by those skilled in the art that the foregoing and other changes in form and details can be made therein without departing from the spirit and scope of the present invention.

This application is based on, and claims priority to, Japanese Patent Application No. 2010-155974, filed on Jul. 8, 2010. The disclosure of the priority application, in its entirety, including the drawings, claims, and the specification thereof, is incorporated herein by reference.

What is claimed is:

1. A semiconductor integrated circuit comprising:
a control output terminal which outputs a signal driving a semiconductor switch connected to a primary winding of a transformer;
a current detecting terminal to which a first voltage signal is inputted to which signal a current flowing in the semiconductor switch is converted;
a feedback terminal to which a voltage corresponding to an error of a secondary side output voltage of the transformer is fed back;
a zero current detecting terminal which is connected to an auxiliary winding of the transformer for detecting from the output voltage of the auxiliary winding of the transformer one of a timing at which the semiconductor switch is to be turned-on and both of the timing at which the semiconductor switch is to be turned-on and a timing at which the semiconductor switch is turned off;
a timer which outputs a signal after a specified length of time from the timing at which the semiconductor switch is made turned-off;
a comparator which is connected to the current detecting terminal to detect a second voltage signal different from the first voltage signal; and
an operation mode switching unit which carries out switching between operation modes according to whether the comparator detects the second voltage signal or not during a period during which the semiconductor switch is made turned-off subsequent to the time at which the timer outputted the signal after the specified length of time from the timing at which the semiconductor switch is made turned-off.

2. The semiconductor integrated circuit as claimed in claim 1, further comprising a second comparator which detects the turning-off of the semiconductor switch by a signal inputted to the zero current detecting terminal,
at a timing at which the second comparator detected the turning-off of the semiconductor switch, the timer starting the operation of outputting the signal after the specified length of time.

3. The semiconductor integrated circuit as claimed in claim 1, wherein the timer starts the operation of outputting the signal after the specified length of time at a timing at which a signal of driving the semiconductor switch is inputted and a signal of controlling the turning-off of the semiconductor switch is outputted to the control output terminal.

4. A switching power supply system comprising:
a transformer which has a primary winding, a secondary winding and an auxiliary winding;
a semiconductor switch connected to the primary winding;
a feedback circuit which carries out feedback of a voltage corresponding to an error of an output voltage outputted from the secondary winding; and
a semiconductor integrated circuit comprising:
a current detecting terminal to which a first voltage signal is inputted to which signal a current flowing in the semiconductor switch is converted;
a feedback terminal to which a voltage corresponding to an error of the output voltage fed back by the feedback circuit is inputted;
a zero current detecting terminal which is connected to the auxiliary winding for detecting from the output voltage of the auxiliary winding one of a timing at which the semiconductor switch is to be turned-on and both of the timing at which the semiconductor switch is to be turned-on and a timing at which the semiconductor switch is turned-off;
the semiconductor switch being controlled so as to stabilize the output voltage by the first voltage signal and the voltage corresponding to the error;
wherein the switching power supply system is provided with a mode switching circuit which is able to supply a second voltage signal different from the first voltage signal to the current detecting terminal during a period during which the semiconductor switch is made turned-off according to an external mode switching signal, and the semiconductor integrated circuit comprises:
a timer which outputs a signal after a specified length of time from the timing at which the semiconductor switch is made turned-off;
a comparator which is connected to the current detecting terminal to detect a second voltage signal; and
an operation mode switching unit which carries out switching between operation modes according to whether the comparator detects the second voltage signal or not during a period during which the semiconductor switch is made turned-off subsequent to the time at which the timer outputted the signal after the specified length of time from the timing at which the semiconductor switch was made turned-off.

5. The switching power supply system as claimed in claim 4, wherein the mode switching circuit comprises:
a rectifying device;
a resistor for adjusting a voltage level;
a mode switching transistor which is switched between a turned-on state and a turned-off state according to the mode switching signal,
the rectifying device, the resistor and the mode switching transistor being connected in series between the zero current detecting terminal and the current detecting terminal in the forward direction from the zero current detecting terminal to the current detecting terminal.

6. The switching power supply system as claimed in claim 5, wherein the resistance value of the resistor for adjusting a voltage level is selected so that a value of an input voltage to the comparator in the semiconductor integrated circuit when both of the semiconductor switch and the mode switching transistor are made turned-off becomes higher than a value of a reference voltage for detecting the turning-off of the semiconductor switch.

7. The switching power supply system as claimed in claim 4, wherein the operation mode switching unit in the semiconductor integrated circuit is an overcurrent limiting threshold level changing circuit which changes an overcurrent limiting threshold level according to a logic state of the mode switching signal.

* * * * *